United States Patent [19]

Carey

[11] 3,868,381

[45] Feb. 25, 1975

[54] MANUFACTURE OF 1,1-DISUBSTITUTED-4,4-BIPYRIDYLIUM

[75] Inventor: John Gerard Carey, Runcorn, England

[73] Assignee: Imperial Chemical Industries Limited, London, England

[22] Filed: May 30, 1973

[21] Appl. No.: 365,250

Related U.S. Application Data

[63] Continuation-in-part of Ser. No. 126,903, March 22, 1971, abandoned.

[30] Foreign Application Priority Data

Apr. 3, 1970 Great Britain.................... 15960/70

[52] U.S. Cl.260/295 AM, 260/296 D, 260/247.2 A, 260/294.8 R
[51] Int. Cl............................................ C07d 31/44

[58] Field of Search ................ 260/296 D, 295 AM

[56] References Cited
UNITED STATES PATENTS

| | | | |
|---|---|---|---|
| 3,787,426 | 1/1974 | Colchester et al.............. | 260/296 D |
| 3,790,585 | 2/1974 | Colchester et al. ......... | 260/295 AM |
| 3,793,319 | 2/1974 | Carey et al. .................... | 260/296 D |

*Primary Examiner*—Alan L. Rotman
*Attorney, Agent, or Firm*—Cushman, Darby & Cushman

[57] ABSTRACT

A process for the manufacture of a 1,1'-disubstituted-4,4'-bipyridylium salt wherein each of the substituents contains up to 10 carbon atoms which comprises reacting an N-substituted pyridinium salt with hydrogen cyanide in liquid ammonia and subsequently oxidising the resulting interaction product.

8 Claims, No Drawings

MANUFACTURE OF 1,1-DISUBSTITUTED-4,4-BIPYRIDYLIUM

This invention relates to a process for the manufacture of 1,1'-disubstituted-4,4'-bipyridylium salts which are useful herbicides. The application is a continuation-in-part application of application Ser. No. 126,903, filed Mar. 22, 1971 and now abandoned.

In co-pending Application Serial No. 833,709, now U.S. Patent No. 3,790,585, we have described and claimed a process for the manufacture of 1,1'-disubstituted-4,4'-bipyridylium salts wherein each of the substituents contains up to 10 carbon atoms which comprises reacting an N-substituted pyridinium salt with a cyanide under basic conditions and subsequently oxidising the resulting interaction product. It is stated that the cyanide is preferably an alkali-metal cyanide, notably sodium cyanide.

According to the present invention we provide a process for the manufacture of a 1,1'-disubstituted-4,4'-bipyridylium salt wherein each of the substituents contains up to 10 carbon atoms which comprises reacting an N-substituted pyridinium salt with hydrogen cyanide in liquid ammonia and subsequently oxidising the resulting interaction product.

The reaction between the N-substituted pyridinium salt and the hydrogen cyanide can be carried out simply by mixing the reagents in liquid ammonia and allowing the mixture to warm, or heating it, in a sealed vessel. If desired the hydrogen cyanide may be generated in situ. The reaction between the pyridinium salt and the hydrogen cyanide preferably is carried out under substantially anhydrous conditions, although up to 10 molar per cent of water has little or no effect on the yield or the interaction product.

Any source of hydrogen cyanide may be employed which is capable of generating hydrogen cyanide in situ under the conditions of the reaction. Examples of suitable sources of hydrogen cyanide are ketone cyanohydrins, for example acetone cyanohydrin, from which hydrogen cyanide is generated simply by mixing with a base and/or by heating.

In carrying out the process of the invention, hydrogen cyanide (or a source thereof) and the N-substituted pyridinium salt are added to liquid ammonia, usually at a temperature of below −30°C, and the mixture is allowed to warm to the desired temperature in a sealed reaction vessel. The temperature of the reaction mixture is not critical and the mixture may be heated to a temperature of up to 150°C, for example from 0° to 120°C, especially from 20° to 90°C. A particularly suitable technique is to add liquid hydrogen cyanide to liquid ammonia in which the N-substituted pyridinium salt is already suspended or dissolved, at a suitably low temperature, for example −70°C, and then allow the mixture to warm to room temperature (about 20°C) or to heat it to a higher temperature in a closed reaction vessel.

It is not essential, however, to add the hydrogen cyanide to liquid ammonia (which may already have the pyridinium salt dissolved or suspended therein) at a temperature below −30°C. In a suitably designed pressure apparatus the hydrogen cyanide can be added to liquid ammonia at any desired temperature. The superatmospheric pressure arising due to use of liquid ammonia at temperatures in excess of −30°C does not adversely affect the reaction; pressures of up to 10 atmospheres or even higher are usually created.

The reaction of the N-substituted pyridinium salt and the hydrogen cyanide, in liquid ammonia, preferably is carried out under a non-oxidising atmosphere, in particular under an essentially oxygen-free atmosphere. A non-oxidising atmosphere can be created by flushing the reaction vessel with an inert gas, for example nitrogen, or with ammonia. If desired ammonia may be permitted to vaporize within the reaction vessel to dispel oxygen (air) prior to sealing of the vessel.

We have found that the reaction is catalytic in respect of hydrogen cyanide so that only small amounts (catalytic quantities) of this reagent need be employed. The amount of the hydrogen cyanide is not critical, however, and may vary from a trace to a large excess of this reagent. By "excess" we mean more than 1 mole of the cyanide per mole of the N-substituted pyridinium salt. The concentration of the N-substituted pyridinium salt in the liquid ammonia is not critical, and the optimum concentration for any desired reaction conditions can be determined by simple experiment. In general, however, concentrations of from 0.1 to 10.0 moles per litre and especially about 0.5 to 5.0 moles per litre may be employed.

The N-substituted pyridinium salts which can be converted to a 1,1'-disubstituted-4,4'-bipyridylium salt by the process of our invention may be selected from those having an N-substituent containing up to 10 carbon atoms and which is a lower alkyl group, a carbamido lower alkyl group or a hydroxy lower alkyl group. The lower alkyl, carbamido lower alkyl or hydroxy lower alkyl substituent is unchanged by the reaction with hydrogen cyanide or by the subsequent oxidation and so appears unchanged in the final 1,1'-disubstituted-4,4'-bipyridylium salt. Any lower alkyl, carbamido lower alkyl or hydroxy lower alkyl group may be present. Especially valuable 1,1'-disubstituted-4,4'-bipyridylium salts are obtained using N-substituted pyridinium salts wherein the N-substituent is a methyl, a carbamidomethyl or a hydroxyethyl group. The carbamidoalkyl substituent has the formula −R$_1$−CO−NR$_2$R$_3$ wherein R$_1$ is a hydrocarbon radical (especially the methylene radical) and R$_2$ and R$_3$ are hydrocarbon or substituted hydrocarbon radicals and R$_2$ and R$_3$ may, together with the attached nitrogen atom make up a heterocyclic ring.

The N-substituted pyridinium salt is conveniently a halide for example a bromide and especially a chloride salt (irrespective of the N-substituent), though the anionic species is not critical and any salt may be used of which the anion is inert towards cyanide ions. The pyridine nucleus may be substituted by one or more inert substituents, for example alkyl groups, in the 2, 3, 5 and 6 positions. In the case of an N-alkyl pyridinium salt the N-alkyl group preferably contains from 1 to 4 carbon atoms.

The interaction product derived from the N-substituted pyridinium salt and the hydrogen cyanide is a 1,1'-disubstituted-1,1'-dihydro-4,4'-bipyridyl and this is readily oxidised to the corresponding 1,1'-disubstituted-4,4'-bipyridylium salt by treatment with an oxidising agent which is an electron acceptor and has a redox potential in water more positive than −0.50 volt as compared with the saturated calomel electrode. Examples of suitable oxidising agents are ceric sulphate (in dilute sulphuric acid); metal salts, especially the halides; inorganic oxyacid anhydrides, especially sulphur dioxide; chlorine; oxygen or air, preferably in conjunction with water and/or carbon dioxide and/or an acid for example acetic acid or sulphuric acid; and organic oxidising agents for example quinones such as benzoquinone, chloranil and anthraquinone. The oxidation step advantageously, but not necessarily, is carried out under acidic conditions, the apparent pH of the reaction mixture being preferably less than 6, especially from 4 to 6.

A convenient procedure for oxidising the intermediate 1,1'-disubstituted-1,1'-dihydro-4,4'-bipyridyl comprises treating the dihydrobipyridyl (preferably a solution thereof in a water-immiscible organic solvent) with a solution of a 1,1'-disubstituted-4,4'-bipyridylium salt (preferably an aqueous solution thereof) to form a 1,1'-disubstituted-4,4'-bipyridylium cation radical, and subsequently oxidising this cation radical. Such a process is described and claimed in co-pending application Ser. No. 107,412, now U.S. Pat. No. 3,793,335. The 1,1'-substituents of the bipyridylium salt used as oxidising agent are preferably the same as the 1,1'-substituents of the dihydrobipyridyl to be oxidised. Oxidation of the 1,1'-disubstituted-4,4'-bipyridylium cation radical is very easily effected in known manner, for example by means of oxygen or an oxidising agent as described hereinbefore in respect of oxidation of dihydrobipyridyls, for example chlorine or sulphur dioxide.

The intermediate reaction product of the N-substituted pyridinium salt and the hydrogen cyanide can be oxidised directly without isolation from the mixture in which it has been prepared, but in this case the final bipyridylium salt is impure and requires to be purified. In particular the bipyridylium salt so obtained contains free cyanide ions and these anions may react with the bipyridylium cation, so reducing the overall yield of the bipyridylium salt. Methods for separating the bipyridylium cations from free cyanide ions are more fully described in co-pending application Ser. No. 833,709, now U.S. Pat. No. 3,790,585.

It is usually more convenient to isolate the intermediate reaction product prior to oxidising it so that oxidation yields a fairly pure 1,1'-disubstituted-4,4'-bipyridylium salt substantially free from cyanide ions. The intermediate product is a slurry and the solid can be isolated by filtration or by solvent extraction. Suitable solvents for the extraction are hydrocarbons, particularly aromatic hydrocarbons and notably toluene. The temperature can be from 0°C to 100°C.

The invention is illustrated but in no way limited by the following Exmples:

EXAMPLE 1

Liquid hydrogen cyanide (0.3 ml, 0.1 m) was added to a solution of N-methyl pyridinium chloride (2.4639g) in liquid ammonia (10 ml) at −70°C under an atmosphere of nitrogen. The reaction tube was sealed and the mixture was allowed to warm to room temperature (approx. 20°C). The superatmospheric pressure so produced was estimated to be about 10 atmospheres. After 4 hours the tube was opened under nitrogen and the ammonia was removed by evaporation. The crystalline residue so obtained consisted essentially of 1,1'-dimethyl-1,1'-dihydro-4,4'-bipyridyl and ammonium chloride. This residue was treated with an aqueous solution of sulphur dioxide (50 mls containing 3 to 4 mls of sulphur dioxide). The resulting solution was analysed polarographically and spectrophotometrically, and was found to contain 1.75g of 1,1'-dimethyl-4,4'-bipyridylium ion. This yield corresponds to a reaction efficiency of 96.9 percent.

The above procedure was repeated nine times (Expts. 2 to 10) using the amounts of reagents and reaction conditions shown in the Table below in which the reaction efficiencies achieved are also shown.

A further experiment (No. 11) was carried out using the above procedure but employing N-methyl pyridinium iodide instead of N-methyl pyridinium chloride.

Table

| Exp. No. | Reagents (mole %) m.p.c. | $NH_3$ | HCN | $H_2O$ | Time (hrs) | Reaction Efficiency (%) |
|---|---|---|---|---|---|---|
| 1 | 3.6 | 95 | 1.5 | — | 4 | 97 |
| 2 | 3.5 | 95 | 1.5 | — | 1.75 | 78 |
| 3 | 5.5 | 93 | 1.8 | — | 2.25 | 82 |
| 4 | 2.3 | 95 | 1.0 | 1.4 | 4 | 97 |
| 5 | 2.3 | 94 | 0.9 | 2.8 | 4 | 93 |
| 6 | 2.5 | 93.5 | 1.0 | 3.0 | 4 | 97 |
| 7 | 2.2 | 96 | 2.6 | 8.9 | 4 | 74 |
| 8 | 2.1 | 88 | 0.8 | 9.1 | 4 | 70 |
| 9 | 2.2 | 87 | 0.8 | 10.2 | 4 | 50 |
| 10 | 2.2 | 87 | 0.9 | 10.3 | 22 | 98 |
| 11* | 2.9 | 96 | 1.2 | — | 4 | 96 |

*denotes that N-methyl pyridinium iodide was employed instead of m.p.c.
m.p.c. = N-methyl pyridinium chloride

EXAMPLE 2

Liquid hydrogen cyanide (0.54g) was added to a stirred solution of N-(2-hydroxyethyl) pyridinium chloride (1.68g) in anhydrous liquid ammonia (8 ml) at −70°C under an atmosphere of nitrogen. The reaction tube was sealed and the mixture was allowed to warm to room temperature (20°C). After 80 hours the tube was opened under nitrogen and the ammonia was evaporated. The residue, 1,1'-di (2-hydroxyethyl)-1,1'-dihydro-4,4'-bipyridyl was treated with aqueous sulphur dioxide (50 mls containing 3 mls sulphur dioxide) and the resulting solution was analysed as described in Example 3. The analysis indicated the presence of 1.32g of 1,1'-di (2-hydroxyethyl)-4,4'-bipyridylium ion, corresponding to a reaction efficiency of 100 percent based on N-(2-hydroxyethyl) pyridinium chloride fed.

The above experiment was repeated except that the period of 80 hours was reduced to 12 hours. The reaction efficiency was 97 percent.

When the above experiment was repeated using 0.01 mole of N-(2-hydroxyethyl) pyridinium chloride, 10 mls ammonia and 0.001 mole hydrogen cyanide the reaction efficiency was 97 percent.

EXAMPLE 3

Liquid ammonia (20 mls), N-(3,5-dimethyl-morpholino-carbamidomethyl) pyridinium chloride (2.5g) and liquid hydrogen cyanide (0.3 ml) were placed in a Carius tube at −70°C under nitrogen and the tube was sealed. The mixture was allowed to warm to room temperature (approx. 20°C). After 12 hours the tube was opened under nitrogen and the ammonia was removed by evaporation. The resulting deep-red residue was shown to be 1,1'-di(3,5-dimethylmorpholine-carbamidomethyl)-1,1'-dihydro-4,4'-bipyridyl and this was treated with a saturated aqueous solution of sulphur dioxide (100 mls containing 6 mls $SO_2$). The solution so obtained was found to contain 2.5g of the 1,1'-di (3,5-dimethylmorpholino-carbamidomethyl)-

4,4'-bipyridylium salt). This yield corresponds to a reaction efficiency of 100 percent.

EXAMPLE 4

Liquid hydrogen cyanide (0.3 ml) was added to a solution of N-methyl alpha-picolinium iodide (5.99g) in liquid ammonia (15 mls) in a Carius tube at −70°C under an atmosphere of nitrogen gas. The tube was sealed and its contents allowed to warm to room temperature (about 20°C). After a period of 60 hours the tube was opened and the ammonia was removed by evaporation. To the brown crystalline residue so obtained, identified as 1,1'-dimethyl-1,1'-dihydro-4,4'-bis (alpha-picoline), was added water (100 mls) and chlorine gas was bubbled through the mixture until the precipitate had disappeared. Ammonium amsonate was then added and a blue solid precipitated out. This precipitate was separated by filtration and treated with 1N hydrochloric acid. The resulting aqueous solution was found by analysis to contain 1,1'-dimethyl-4,4'-bis (alpha-picoline) dichloride. Evaporation of the solution and recrystallisation of the precipitate from an isopropanol/acetone mixture afforded 3.5g of 1,1'-dimethyl-4,4'-bis (alpha-picolinium) dichloride, corresponding to a reaction efficiency of 95% based on N-methyl alpha-picolinium iodide fed.

EXAMPLE 5

Liquid hydrogen cyanide (0.3 ml) was added to a solution of N-methyl-2,6-lutidinium iodide (4g) in liquid ammonia (15 mls) in a Carius tube at −70°C under an atmosphere of nitrogen gas. The tube was sealed and allowed to warm to room temperature (about 20°C). After a period of 80 hours, the tube was opened and the ammonia was removed by evaporation. The dark, crystalline residue so obtained was treated with an aqueous solution of sulphur dioxide (3 mls $SO_2$ in 100 mls water). The resulting aqueous solution was analysed and found to contain 1.2g of 1,1'-dimethyl-4,4'bi (2,6-lutidinium) ion corresponding to a reaction efficiency of 61 percent based on N-methyl-2,6-lutidinium iodide fed. 0.71g of N-methyl-2,6-lutidinium ion was recovered (36 percent of the amount fed).

EXAMPLE 6

Liquid hydrogen cyanide (0.2 ml) was added to a slurry of N-methyl pyridinium iodide (2.3g) in liquid ammonia (15 mls at a temperature of −70°C in a Carius tube. The tube was sealed under nitrogen and then heated to 70°C. After 1.5 hours at 70°C, the tube was cooled to −70°C and opened, and the contents of the tube were emptied into a 1-litre flask from which the ammonia was allowed to evaporate. An aqueous solution (50 mls) of sulphur dioxide containing 3.4 mls sulphur dioxide) was added to the contents of the flask. The resulting aqueous solution was analysed spectrophotometrically and was found to contain 1,1-dimethyl-4,4'-bipyridylium dication (0.77g), representing a reaction efficiency of 79 percent based on N-methyl pyridinium iodide fed.

EXAMPLE 7

Example 6 was repeated except that 2.5g of N-methyl pyridinium iodide were used and the reaction mixture was heated at 135°C for 1.5 hours instead of 70°C. 0.65g of 1,1'-dimethyl-4,4'-bipyridylium dication was obtained, representing a reaction efficiency of 61 percent based on N-methyl pyridinium iodide.

EXAMPLE 8

Example 6 was repeated with the differences that N-(2-hydroxyethyl)-pyridinium chloride (2.55g) was used instead of N-methyl pyridinium iodide, 10 mls of ammonia were used and the reaction mixture was heated at 80°C for 2.5 hours. Analysis of the final aqueous solution indicated the presence of 1,1'-di(2-hydroxyethyl)-4,4'-bipyridylium dication in an amount representing a reaction efficiency of 35 percent.

We claim:

1. A process for the manufacture of a 1,1'-disubstituted-4,4'-bipyridylium salt wherein each of the substituents is selected from the group consisting of lower alkyl, carbamido lower alkyl and hydroxy lower alkyl groups containing up to 10 carbon atoms which consists essentially of reacting the corresponding N-substituted pyridinium salt with hydrogen cyanide in a medium consisting essentially of substantially anhydrous liquid ammonia under a non-oxidising atmosphere at a temperature of from −70°C. to no more than 150°C, and subsequently oxidising the resulting interaction product by means of an oxidising agent having a redox potential in water more positive than −0.50 volt as compared with the saturated calomel electrode.

2. A process as claimed in claim 1 wherein the reaction between the pyridinium salt and hydrogen cyanide is carried out at a temperature of from 0°C to 120°C.

3. A process as claimed in claim 2 wherein the reaction is carried out at a temperature of from 20°C to 90°C.

4. A process as claimed in claim 1 wherein liquid hydrogen cyanide is added to a solution or suspension of the N-substituted pyridinium salt in liquid ammonia and the temperature of the reactants is allowed to rise to above 0°C.

5. A process as claimed in claim 1 wherein the concentration of the N-substituted pyridinium salt in the liquid ammonia is from 0.1 to 10 moles per litre.

6. A process as claimed in claim 1 wherein the interaction product is isolated from the reaction mixture prior to oxidation.

7. A process as claimed in claim 1 wherein the hydrogen cyanide is generated in situ.

8. A process as claimed in claim 7 wherein a ketone cyanohydrin is employed as the source of hydrogen cyanide.

* * * * *